United States Patent [19]

Ennis

[11] Patent Number: 5,077,859
[45] Date of Patent: Jan. 7, 1992

[54] VEHICLE WASHING APPARATUS
[75] Inventor: G. Thomas Ennis, Inglewood, Calif.
[73] Assignee: N/S Corporation, Inglewood, Calif.
[21] Appl. No.: 476,907
[22] Filed: Feb. 8, 1990
[51] Int. Cl.[5] .............................................. B60S 3/06
[52] U.S. Cl. ........................................ 15/230; 15/53.2;
         15/230.14; 15/230.16; 15/DIG. 2
[58] Field of Search .................. 15/53.2, 97.3, 230,
         15/230.14, 230.16, 230.17, DIG. 2

[56] References Cited
U.S. PATENT DOCUMENTS

| | | | |
|---|---|---|---|
| 426,859 | 4/1890 | Ross | 15/230 X |
| 2,257,864 | 10/1941 | Sheehan | 15/230 |
| 3,728,075 | 4/1973 | Cannan | 15/98 X |
| 3,765,043 | 10/1973 | Lesser | 15/97.3 |
| 3,774,259 | 11/1973 | Genaro | 15/97.3 |
| 4,045,836 | 9/1977 | Glenn | 15/53.2 X |
| 4,377,878 | 3/1983 | Pecora | 15/97.3 |
| 4,611,359 | 9/1986 | Bivens | 15/230 X |
| 4,839,211 | 6/1989 | Wilkie et al. | 428/97 X |
| 4,941,225 | 7/1990 | Liao | 15/98 |
| 4,961,243 | 10/1990 | Barber | 15/98 X |

FOREIGN PATENT DOCUMENTS

355999  9/1931  United Kingdom .................. 15/230

Primary Examiner—William A. Cuchlinski, Jr.
Assistant Examiner—J. K. Folker
Attorney, Agent, or Firm—Staas & Halsey

[57] ABSTRACT

A deep pile, fur-like material is used in an automated vehicle washing apparatus to simulate a vehicle hand wash. The vehicle washing apparatus uses a resilient drum constructed of a pair of spaced apart disks and an elastic cord which extends between the disks around the circumference of each disk. A cover is wrapped around the cord, and over a portion of the plates, so that the cover rotates with the plates, which rotate with the shaft. The cover includes a plurality of shingles which extend radially outwardly under centrifugal force. The shingles are preferably made of a deep pile fur-like material. Alternatively, a foam core member wrapped around a rotatable support carries a cover which is made of deep pile, fur-like material.

43 Claims, 5 Drawing Sheets

VEHICLE WASHING APPARATUS

BACKGROUND OF THE INVENTION

1. Field of the Invention

The present invention relates generally to a mechanized vehicle washing apparatus utilizing an improved cleaning material and, more specifically, to a deep pile fur-like cleaning material, and a mechanized vehicle washing apparatus employing the material.

2. Description of the Related Art

Figure 1:
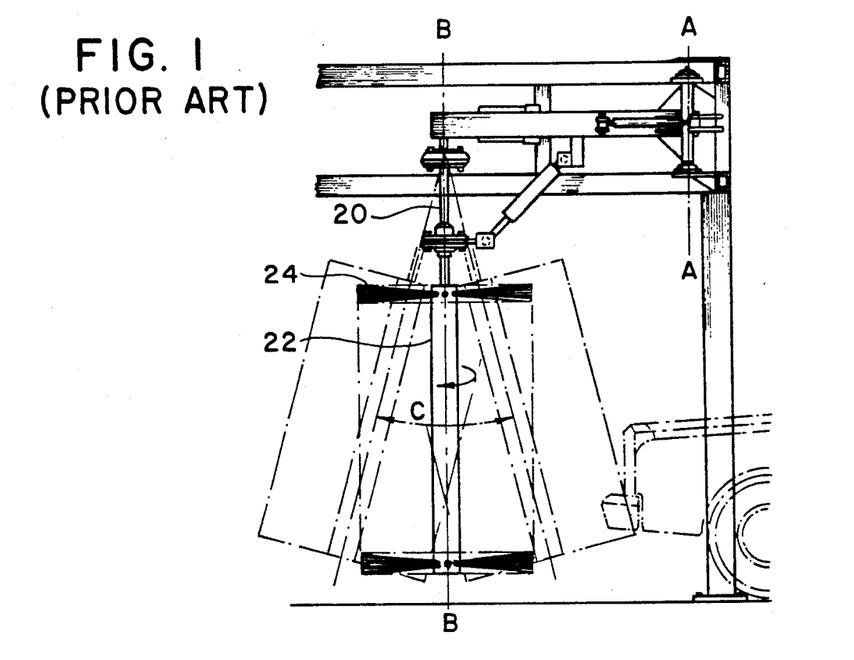
FIG. 1 is a side elevational view of a known vehicle washing apparatus.

In the field of mechanized vehicle washing, improvements have been made over the years to the mechanical structure which facilitates the movement of rotating brush assemblies over and around the surfaces of an automobile to be cleaned. One such advancement in the art is described in U.S. Pat. No. 4,299,003, which describes therein a vehicle washing apparatus which includes a supporting frame, a brush support arm pivotally mounted at one end directly to the frame, a rotatable mount for mounting a rotatable brush at the distal end of the arm, and a drive for rotating the brush. Referring to FIG. 1, a brush assembly of the cleaning apparatus swings about pivot axis A, rotates about axis B, and swivels in the direction C. A rotatable shaft 20 carries a bristle drum which has bristles 24 projecting radially outwardly from an outer cylindrical surface thereof.

While mechanized vehicle washing is generally accepted, there has been a recent trend back to hand washing, whereby softer cleaning materials can be employed, thus obviating the need for bristle-type brush assemblies as illustrated in FIG. 1.

Hand washing may be desirable, but it has practical limitations. For example, it is labor intensive, and adequate supply of inexpensive labor cannot be guaranteed. Even if cheap labor is available, the quality of the wash is often not as good as with mechanized systems which ensure complete coverage of vehicle surfaces.

It is generally known to provide a brush assembly similar to the one illustrated in FIG. 1, in which strips of cloth are mounted on the brush hub 22 instead of the bristles 24. Normally, the brush hub 22 has a diameter of between four and five inches, sometimes up to thirteen inches, yet the overall diameter when the cloth strips extend radially outwardly in a substantially horizontal disposition under centrifugal force, is about forty inches. The strips of cloth have a length which tends to cause them to wrap around radio antennae, rear view mirrors, bumpers, etc., thus causing damage to the strips and to the cars they are cleaning.

U.S. Pat. No. 4,611,359 (Bivens) describes a brush assembly having an inflatable core and a plurality of strips of felt-like material. The strips of felt-like material vary in length along the support shaft so as to provide a uniform outer diameter even though the inflatable core is provided only on a medial portion of the shaft. Although the inflatable core is provided for safety reasons, many of the strips of felt-like cloth are long enough in the radial direction to damage antennae, mirrors, etc.

SUMMARY OF THE INVENTION

An object of the present invention is to use hand washing materials in a mechanized vehicle washing system.

Another object of the present invention is to provide a mechanized vehicle washing apparatus which is capable of achieving hand wash quality.

Another object of the present invention is to provide a vehicle washing apparatus which uses non-abrasive materials similar to those used in a hand washing operation.

Another object of the present invention is to provide a vehicle washing apparatus that can be easily assembled and disassembled.

Another object of the present invention is to provide a vehicle washing apparatus which operates quietly as compared to conventional devices which employ bristles and/or elongated flaps.

Still another object of the present invention is to provide a support structure used in a vehicle washing apparatus capable of resilient deformation to accommodate varying contours of a vehicle body.

These and other objects of the invention are met by providing a vehicle washing apparatus which includes a rotatable shaft having opposite axial end portions, resilient means coupled to the shaft and forming a skeletal frame, and a fabric cover overlying and being detachably coupled to the skeletal frame.

In another aspect of the invention, the skeletal frame is replaced by a core member made of resilient foam material. The fabric cover is then applied directly over an outer surface of the core member.

In either of the above embodiments, the fabric cover is made of a synthetic fur-like deep pile material, which is formed as a wrap-around sheet having a plurality of fabric shingles of the same material extending radially outwardly under centrifugal force.

In another aspect of the present invention, a curtain mountable on a reciprocating support includes a base portion for hanging the curtain on the support, a plurality of elongated parallel strips hanging downwardly from the base portion, each elongated strip having opposite side surfaces, and a plurality of shingles connected to the opposite side surfaces of the elongated parallel strips.

The curtain is made of the same fabric used in the vehicle washing apparatus described above, specifically, the synthetic fur-like deep pile material.

In still another aspect of the present invention, a mechanized vehicle washing apparatus includes at least one movable support, and a cleaning element carried by the at least one movable support, the cleaning element being made of a deep pile, fur-like material.

These and other features and advantages of the vehicle washing apparatus of the present invention will become more apparent with reference to the following detailed description and drawings.

DETAILED DESCRIPTION OF THE PREFERRED EMBODIMENT

Figure 2:
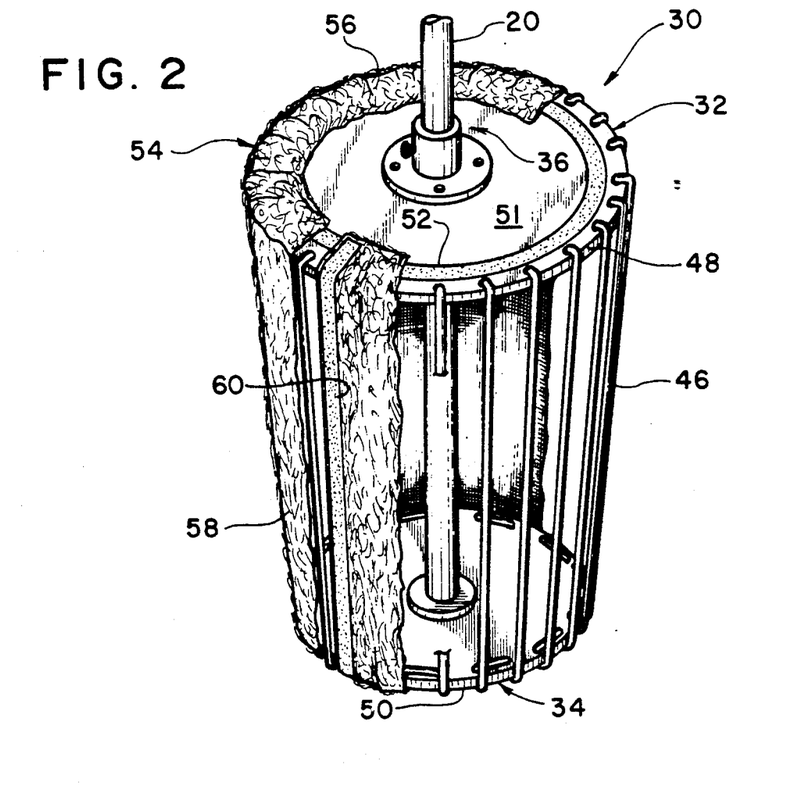
FIG. 2 is a perspective view, partially cut away, showing a first, preferred embodiment of the present invention, with portions of the cover not shown for clarity.
Figure 3:
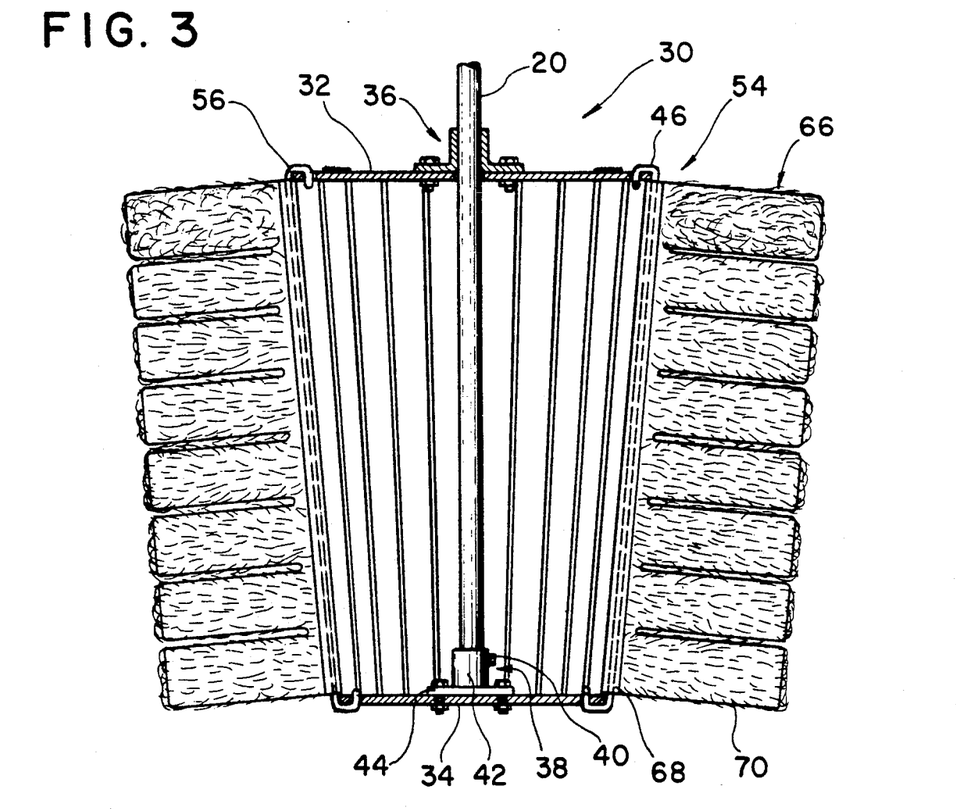
FIG. 3 is a vertical cross-sectional view of the structure illustrated in FIG. 2.

Referring now to FIGS. 2 and 3, a vehicle washing apparatus is generally referred to by the numeral 30. A rotatable shaft 20 carries a pair of spaced-apart plates 32 and 34, each of which is secured to the shaft for rotation therewith through collars 36 and 38, respectively. Each collar has at least one set screw 40 threadedly engaging a transverse bore provided in a sleeve portion 42 of the collar. A flange portion 44 of each collar is attached to one of the plates by any suitable fastener means, such as threaded bolts and nuts.

Preferably, the plates 32 and 34 are made of plastic material, and the collars 36 and 38 are made of metal.

Figure 5:
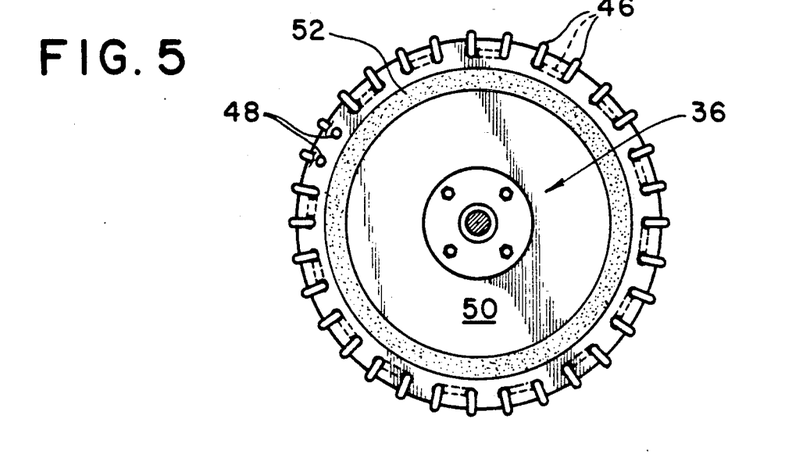
FIG. 5 is a top plan view of the skeletal frame subassembly which carries the fabric sheet according to the present invention.

A plurality of elastic cords 46 extend between the circumferential edges 48 and 50 of the plates 32 and 34, respectively. The elastic cords are generically known as "shock" cords and are commercially available. The cords 46 are spaced radially around each plate at equidistant intervals. In FIG. 5, thirty-two such cords are shown. In another embodiment (not illustrated) thirty-six cords are provided at ten degree intervals around the circumference in a parallel manner. Also, the cords may be provided individually as separate cords, or all of the cords may be united as a single strand which is laced through holes, or around mounting hooks (not illustrated) provided around the peripheral region of the plates.

FIG. 5 illustrates an example of a lacing technique, in which the cords 46 are integrally formed as a single strand which is laced through a plurality of openings 48 formed radially around each plate (plate 32 being illustrated in FIG. 5) along a common radius.

The upper (outer) surface 51 of the plate 32 is provided with an annular strip 52 of either micro-hook or micro-loop complementary fastener means, such as VELCRO, which coacts with an overlaid annular strip of opposite type material provided on an inner surface of a cover 54 which is wrapped around the plate and cord sub-assembly (corresponding to plates 32 and 34, and the cords 46). The complementary fastener means thus positionally fixes and detachably connects the cover 54 to a skeletal frame sub-assembly. The connection is further enhanced by an annularly disposed drawstring 56 which is sewn into the upper portion of the cover 54 near the strip of fastener material.

The cover 54, only partially illustrated in FIG. 2, has essentially two aspects: a base component and a shingle component. The base component is a wraparound sheet 58, the opposite ends of which are adjoined by complementary fastener means, such as the VELCRO fasteners used on the outer surfaces of the plates 32 and 34. For example, FIG. 2 illustrates a substantially vertically oriented strip 60 of complementary fastener material, such as either micro-hook or micro-loop strips which coact with material provided on the opposite end of the sheet 58 (which is cut away in FIG. 2 for illustrative purposes).

Figure 8:
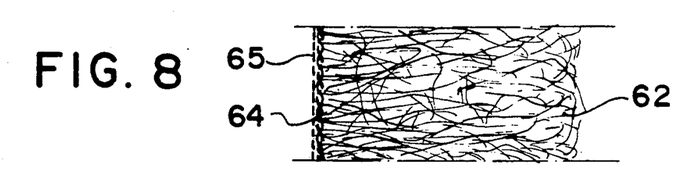
FIG. 8 is an enlarged side elevational view of a piece of the material used in making the shingles and/or base of the cover according to a preferred embodiment of the present invention.

As shown in FIG. 8, the sheet 58 is preferably a deep pile, tufted (randomly oriented) monofilament fibrous material manufactured by Borg Fabrics, of New York, NY. The fabric is a deep pile material which has a fur-like appearance. The deep pile, fur-like material preferably has a thickness or depth of at least ½ inch. In a preferred embodiment, the deep pile, fur-like material has a depth or thickness of approximately ¾ of an inch. The fibers of the material are 85% polyester and 15% acrylic. A small section of this material is illustrated in FIG. 8 as a thick cluster of tufted monofilament fibers 62 upstanding from a woven base 64 which provides a fabric layer. The base 64 is made of 100% polyester, or other comparable materials. This woven base provides an elastic backing which is particularly suitable for a hand washed effect. A non-elastic backing 65 could be applied to the base 64 to prevent stretching, particularly when the material is used as a curtain in which the material hangs downwardly. The backing 65 could be connected by stitching or by adhesive bonding or other suitable means to the base 64. If the backing 65 is applied, the material becomes non-elastic, but remains flexible. As a further alternative, the monofilament fibers 62 may extend in opposite directions from both sides of the base 64 so as to avoid having to stitch two pieces of material with their bases opposing each other to form the shingles 70. Although it is sufficient for each shingle section to have the fibrous material extending outwardly from a base layer, each shingle section 66 may be made of two sections overlying each other so that the opposite sides of the individual shingles have the fibers extending outwardly therefrom. To avoid overlying two pieces, a single piece in which the fibers extend outwardly from opposite surfaces of the base could be used. This particular material is exceptionally soft and capable of retaining water. Moreover, the dense clustering of monofilament fibers enhances detergent foaming. However other materials may be used as the base component, such as canvas. Canvas represents one alternative since it is a strong, woven fabric which can withstand the adverse conditions imposed upon it by a mechanized vehicle washing system.

The shingle component is attached to the sheet 58 as a plurality of shingle sections 66, each of which has an attachment portion 68 and a plurality of shingles 70 which extend radially outwardly therefrom. The shingle sections are sewn or otherwise attached by suitable means to the sheet 58 in an overlapping, parallel distribution so that when laid out, the adjacent shingles of one section cover the attachment portion of the next section. Each shingle section 66 is cut out of a single, rectangularly shaped piece of the deep pile, fur-like material which was described above. As mentioned above, in order to have the fibrous material extend from both opposite surfaces of each individual shingle 70, two shingle sections 66 can be stitched or otherwise connected to each other by overlying the smooth bases thereof.

As an alternative to relatively small, individual shingles 70, each shingle section can be formed as a single, large shingle in which there are no horizontal cuts between individual shingles. Thus, referring to FIG. 4(c), instead of having eight individual shingles extending outwardly from a base portion 68, a single shingle 70 would extend outwardly from the base portion 68. This large shingle would have the same overall, outer dimensions of the shingle section 66, but would not have the individual, horizontal cuts which define the individual smaller shingles 70.

Figure 4A:
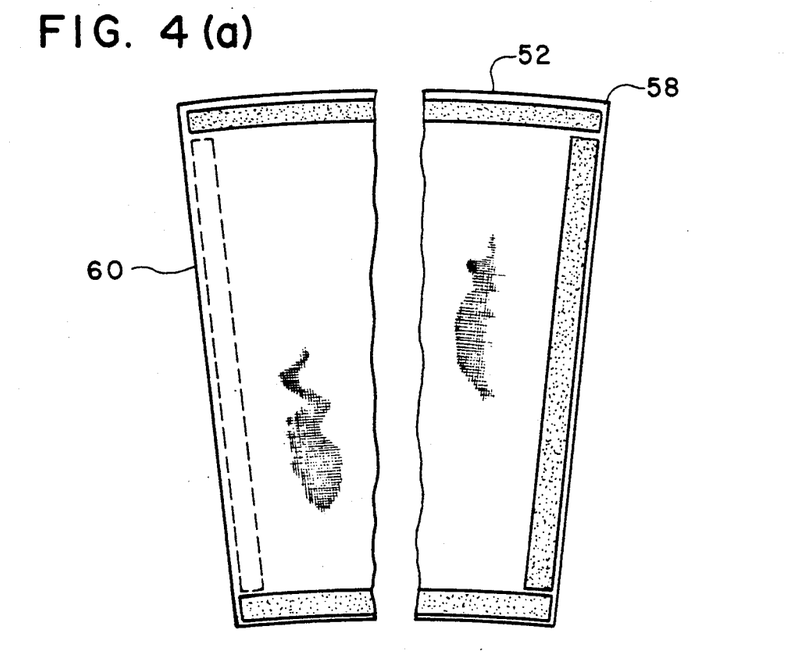
FIG. 4(a) is a top plan view of a base sheet component of a cover which is used in the preferred embodiment of the present inventions, with the shingle component being removed for illustration.
Figure 4B:
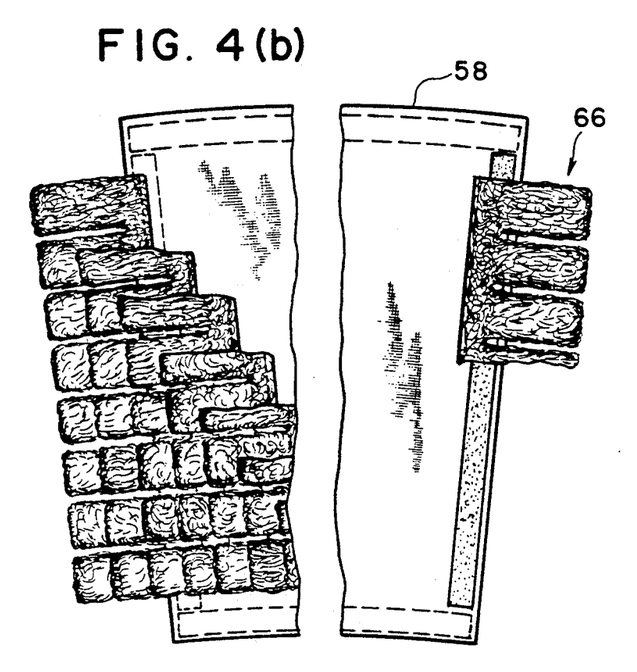
FIG. 4(b) is a top plan view of the cover, showing both the base sheet and shingle components.
Figure 4C:
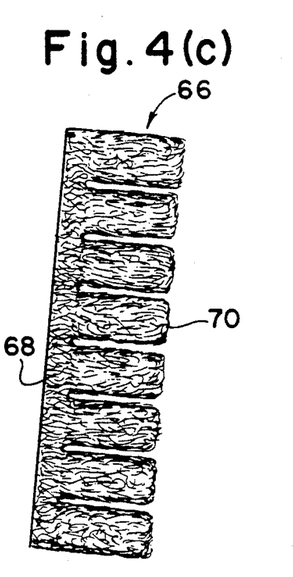
FIG. 4(c) is a top plan view showing one of the shingle segments which are sewn to the base sheet.

FIG. 4(a) shows the sheet 58 prior to attaching any of the shingle sections 66, and further illustrating the VELCRO strips 52 and 60. FIG. 4(b) illustrates the base sheet 58 with the plurality of shingle sections 66 attached thereto. It should also be noted that the base sheet 58 in FIGS. 4(a) and 4(b) forms a cone-shaped cover when wrapped around the two plates 32 and 34, due to the fact that in the illustrated embodiment, the upper plate 32 has a larger diameter than the lower plate 34. In the alternative, both plates can have the same diameter so as to define a cylindrically shaped support structure. In this case, the base sheet 58 will be rectangular instead of trapezoidal. In FIG. 3, the individual shingles 70 are illustrated in a radially extending position which is achieved by centrifugal force generated by rotation of the support shaft 20. When the shaft 20 is not rotating, the shingles 70 will droop downwardly since the deep pile material of which the shingles are made is pliable. Each shingle 70 should have a diametrically opposed shingle to balance the overall structure during rotation.

The length of the shingles 70 when radially extended is selected so as to avoid damage to vehicles. In the preferred embodiment, the overall diameter of the apparatus measured from the distal ends of diametrically opposed shingles 70 is about 40 inches, with the diameter of the plates being about twenty-six inches and the extended length of each shingle being about seven inches (fourteen inches total for two diametrically opposed shingles), thus defining a preferred ratio of inner drum diameter to shingle length to be 0.65. This is substantially less than previously used brush assemblies, in which the support drum was provided with a minimal diameter, and the bristles or strips were given a more substantial length.

The small ratio described above is in part the result of the resilient nature of the skeletal support, which is formed by the plates and the elastic cords. Normally, the small diameter support drum with elongated bristles or strips is required because as a vehicle passes through the system, the variations in vehicle contour and size result in more or less constant changes in the distance between the inner support drum and the vehicle surfaces which are being cleaned. The prior use of elongated bristles or strips compensated for these variations so as to provide, as much as possible, an even scrubbing action on the vehicle throughout the length of the brush assembly.

According to the present invention, as the vehicle contour changes, and thus the relative distances between the vehicle surfaces and the support drum, movement of the vehicle surfaces closer to the rotatable shaft 20 are compensated for by flexure of the cords 46. In other words, the elastic cords 46 allow the "drum" as well as the shingles to conform to the shape of the vehicle.

While the shingles are illustrated to be rectangularly shaped, they may also be formed in other shapes, such as a mit having plural fingers. The fingers will enhance the cleaning action of each shingle.

Figure 6A:
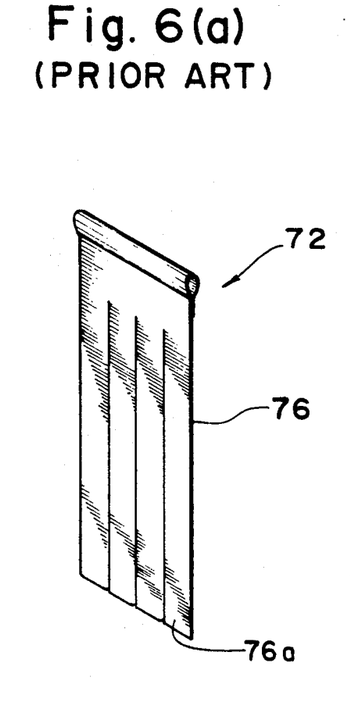
FIG. 6(a) is a perspective view of a known curtain used in a mechanized vehicle washing apparatus.
Figure 6B:
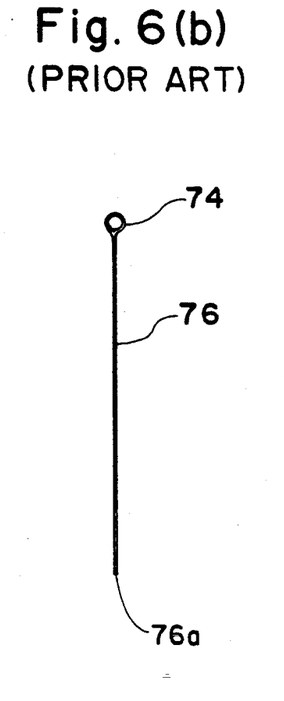
FIG. 6(b) is an end view of the curtain shown in FIG. 6(a)
Figure 6C:
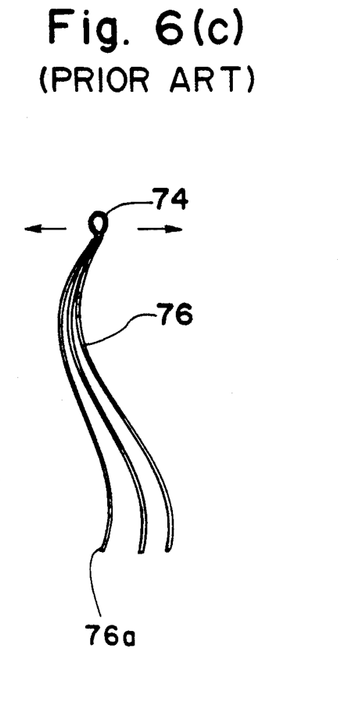
FIG. 6(c) is an end view of the curtain of FIG. 6(a) during reciprocating movement of the support.

FIGS. 6(a)-6(c) illustrate a known curtain 72 which is commonly used in mechanized vehicle washing systems. Normally, the curtain 72 has a supporting portion 74 which is used to hang the curtain from a reciprocating support rod (not shown). A plurality of elongated strips 76 extend downwardly from the support portion 74. When the curtain is reciprocated in the direction of the directional arrows in FIG. 6(c), the strips 76 are caused to move sinusoidally at a given frequency of oscillation, which is substantially a function of the periodic, reciprocating driving force.

Figure 7A:
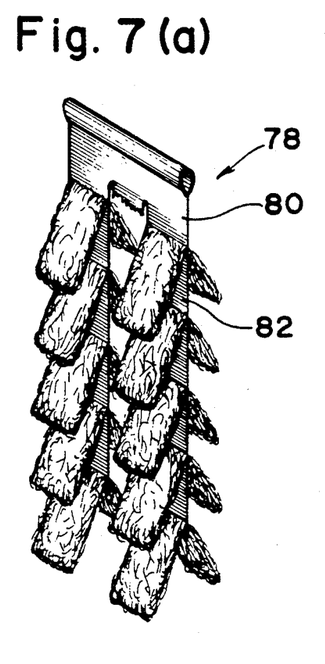
FIGS. 7(a)-7(c) are views corresponding to FIGS. 6(a)-6(c) of a preferred embodiment of a curtain according to the present invention.
Figures 7B, 7C:
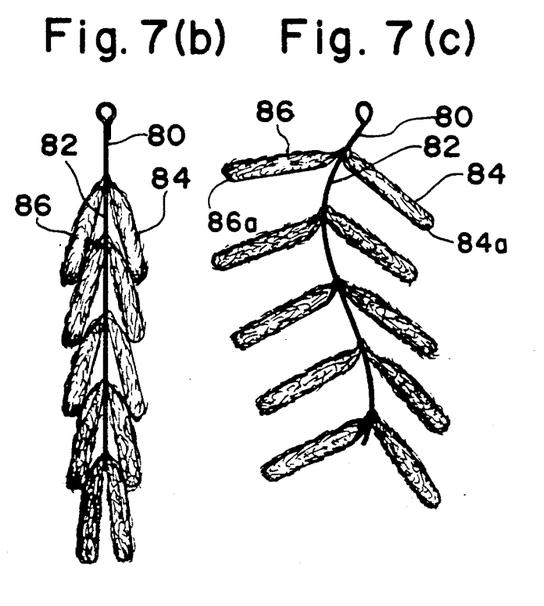

An improved curtain according to the present invention is illustrated in FIGS. 7(a)-7(c), and is referred to by the numeral 78. The curtain 78 includes a similar support portion 80 and a plurality of elongated strips 82. However, according to the present invention, a plurality of shingles 84 and 86 are attached to opposite side surfaces of each of the elongated strips. It has been discovered by the inventor that the shingles on opposite sides of the strips 82 tend to increase the frequency of oscillation, as shown in FIG. 7(c), for the same amount of driving force. The increased frequency of oscillation tends to better emulate the small, circular hand movements of a "hand wash".

The shingles 84 and 86 are made of the same deep pile, fur-like monofilament fibrous material described previously with respect to the cover. In the case of the curtain, the shingles may be sewn on individually, or may be attached in individual strip-segments which overlie each elongated strip of the curtain. Moreover, the curtain itself may be made of the same fur-like material, or instead, the curtain may be made of a felt or other suitable material to which the shingles are attached.

An advantage to the embodiment of FIGS. 7(a)-7(c) over the prior art is that in FIG. 6(a)-6(c) it can be seen that the strips 76 have edges 76a which do not come into contact with the vehicle sufficiently often to be effective. In the present invention, each shingle 84 and 86 has a cleaning edge 84a and 86a, which flops independently over the surface of the vehicle so as to enhance the overall cleaning action of the curtain. For example, if cleaning edges in the lower part of the curtain cannot move because of being pressed against the vehicle, the cleaning edges of the upper shingles would be free to move and thus scrub the vehicle.

It should be noted that in variations of the described embodiments, additional plates may be used in the skeletal frame sub-assembly, and more particularly, a medial plate may be disposed between the upper and lower plates 32 and 34. Also, if a longer skeletal frame sub-assembly is required, the cover may be made into separate segments which constitute upper and lower covers which are joined along a circular seam at a mid-point of the structure.

Figure 9:
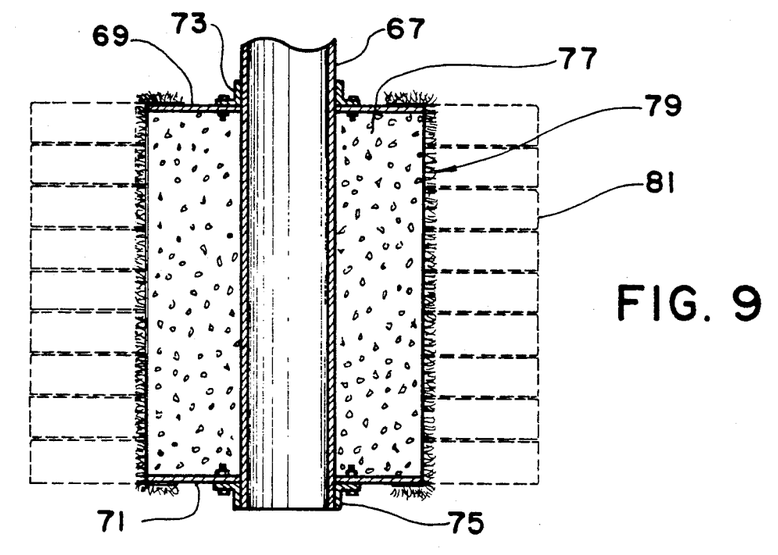
FIG. 9 is a vertical cross-sectional view of a second, preferred embodiment of the present invention.

An alternative embodiment of the present invention is illustrated in FIG. 9, wherein a hollow pipe 67 has two plates 69 and 71 fixedly connected thereto at spaced intervals by collars 73 and 75, respectively. Preferably, the pipe has a diameter of about five inches and is thus wider than the diameter of the rotatable shaft 20 illustrated in the previous embodiments.

Instead of the elastic cords which extend between the two plates in the first embodiment of the invention, the embodiment of FIG. 9 is provided with a resilient core member 77 which is preferably a sheet of closed cell polymeric foam which is wrapped around the pipe 67, with the ends of the foam sheet being matched to provide a cylindrical outer surface. The ends may be joined by any suitable means, including adhesives and the wrapped disposition of the foam sheet around the pipe 67 may be reinforced by providing ties or string (not shown) wrapped around the circumference of the foam material.

The end portion of the pipe 67 may be provided with a double sided tape to reinforce the connection of the core material to the pipe for rotation therewith.

The outer cylindrical surface of the core material 77 is wrapped or enveloped by a cover made of the same material described in the previous embodiment. In FIG. 9, the cover is referred to by the numeral 79, an it may be attached to the core material 77 by means described previously with respect to the other embodiment, such as by providing VELCRO-type complementary fastener means on the outer surfaces of the plates 69 and 71. The cover 79 may also be provided with VELCRO-type, complementary fastener means at its opposite end edges so as to enable the cover to be wrapped around the core material and then held as an endless loop by joining the opposite ends of the sheet.

The cover 79 may be provided with shingles 81 as in the previous embodiment, around the periphery of the cover by attaching shingle segments, or individual shingles thereto. As with the previous embodiment, it is preferred to provide the shingles with diametric opposites so that the overall assembly is balanced when rotated.

Figure 10:
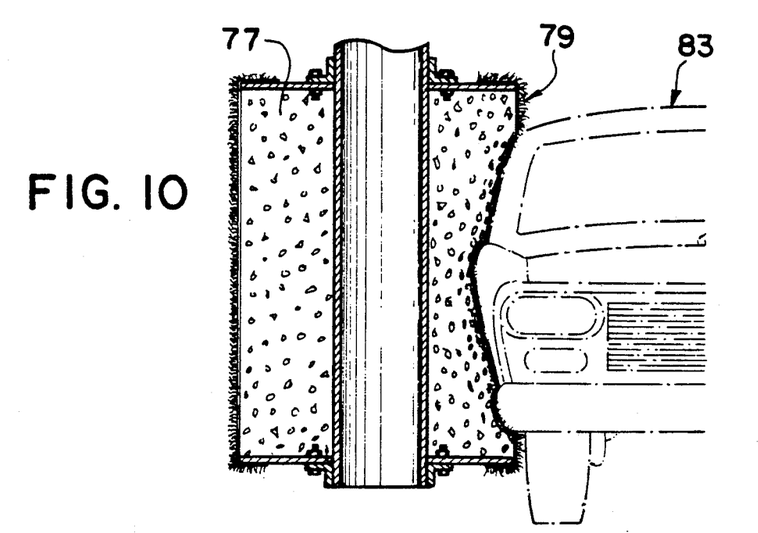
FIG. 10 is a vertical cross-sectional view of the FIG. 9 embodiment (less phantom lines illustrating shingles) and demonstrating how the core material follows the contour of a vehicle being washed.

FIG. 10 illustrates an application of the embodiment of FIG. 9; however, the principles would also apply to the first embodiment which uses a skeletal frame with elastic cords instead of a foam core element. In FIG. 10, the cover 79 is illustrated without the optional shingles 81 which are shown in phantom lines in FIG. 9.

As a vehicle 83 is contacted by the cleaning apparatus, which is caused to rotate by drive means (not shown) the resilient foam core material 77 conforms to the contour of the vehicle 83 so that the cover 79 likewise conforms to the contour of vehicle. This ensures maximum effective cleaning of the vehicle, without causing damage which is sometimes associated with bristled drums or drums carrying elongated flaps.

Numerous modifications and adaptations of the present invention will be apparent to those so skilled in the art and thus, it is intended by the following claims to cover all such modifications and adaptations which fall within the true spirit and scope of the invention.

What is claimed is:

1. A vehicle washing apparatus comprising:
a rotatable shaft having a distal end portion;
resilient means coupled to the shaft and forming a skeletal frame; and
a fabric cover wrapped around and being detachably coupled to and resiliently carried by the skeletal frame;
said fabric cover including a base component which has opposite ends which are joined together when wrapped around the skeletal frame and a shingle component which includes a plurality of diametrically opposed shingles which extend radially outwardly by centrifugal force when the rotatable shaft is rotated, said shingle component being made of deep pile, fur-like material.

2. A vehicle washing apparatus according to claim 1, wherein the base component is made of canvas material.

3. A vehicle washing apparatus according to claim 1, wherein the deep pile, fur-like material is a tufted monofilament fibrous material which extends outwardly from at least one surface of a fabric layer.

4. A support structure for mounting a scrubber element of a vehicle washing apparatus, comprising:
a rotatable shaft;
a first plate coupled to the shaft;
a second plate coupled to the shaft in spaced relation to the first plate, the first and second plates having circumferential edges; and
elastic cord means extending between the circumferential edges of the first and second plates.

5. A cover for a rotatable drum of a vehicle washing apparatus comprising:
a base component formed as an endless belt; and
a shingle component comprised of a deep pile, fur-like material which includes a plurality of shingle segments connected to the base component, each shingle segment having a plurality of shingles which extend radially outwardly under centrifugal force.

6. A cover according to claim 5, wherein the base component is made of canvas material.

7. A vehicle washing apparatus according to claim 5, wherein the deep pile, fur-like material is a tufted monofilament fibrous material which extends outwardly from a fabric layer.

8. A mechanized vehicle washing apparatus for washing a vehicle comprising:
at least one movable support; and
a cleaning element for washing said vehicle carried by the at least one movable support, the cleaning element being made of a deep pile, fur-like material.

9. A mechanical vehicle washing apparatus according to claim 8, wherein the deep pile, fur-like material is a tufted monofilament fibrous material which extends outwardly from a fabric layer.

10. A mechanized vehicle washing apparatus according to claim 9, wherein the fabric layer is elastic.

11. A mechanized vehicle washing apparatus according to claim 10, further comprising a relatively non-elastic backing connected to a smooth surface of the fabric layer.

12. A mechanized vehicle washing apparatus according to claim 8, wherein the cleaning element includes a base layer and the deep pile, fur-like material extends outwardly from opposite surfaces of the base layer.

13. A mechanized vehicle washing apparatus according to claim 8, wherein the cleaning element is comprised of two sections, each of the sections including a base layer from which the deep pile, fur-like material extends and wherein the two sections overlie each other with the base layer of one section being in opposed relationship to the base layer of the other section whereby the deep pile, fur-like material extends outwardly from opposite surfaces of the cleaning element.

14. A vehicle washing apparatus comprising:
a rotatable shaft having a distal end portion;

resilient means coupled to the shaft and forming a skeletal frame;

said resilient means comprising a first plate and a second plate coupled to the shaft at the distal end portion and being in spaced relation to each other, and elastic cord means extending between the first and second plates along circumferential edges thereof; and a fabric cover wrapped around and being detachably coupled to and resiliently carried by the skeletal frame.

15. A vehicle washing apparatus according to claim 14, wherein the elastic cord means comprises a cord inter-laced between the first and second plates through openings formed in each of the plates.

16. A vehicle washing apparatus according to claim 14, wherein the elastic cord means comprises a plurality of cord segments extending between the first and second plates.

17. A vehicle washing apparatus comprising:
a rotatable shaft having a distal end portion;
resilient means coupled to the shaft and forming a skeletal frame; and
a fabric cover wrapped around and being detachably coupled to and resiliently carried by the skeletal frame;
said fabric cover including a base component which has opposite ends which are joined together when wrapped around the skeletal frame and a shingle component which includes a plurality of diametrically opposed shingles which extend radially outwardly by centrifugal force when the rotatable shaft is rotated, said base component being made of deep pile, fur-like material.

18. A vehicle washing apparatus according to claim 17, wherein the deep pile, fur-like material is a tufted monofilament fibrous material which extends outwardly from a fabric layer.

19. A vehicle washing apparatus according to claim 18, wherein the fibrous material is about 85% polyester and about 15% acrylic.

20. A vehicle washing apparatus according to claim 18, wherein the fabric layer is elastic.

21. A vehicle washing apparatus according to claim 20, wherein the fabric layer is made of polyester.

22. A vehicle washing apparatus according to claim 20, further comprising a relatively non-elastic backing connected to a smooth surface of the fabric layer.

23. A vehicle washing apparatus according to claim 18 wherein the base component is an endless belt.

24. A vehicle washing apparatus comprising:
a rotatable shaft having a distal end portion;
resilient means coupled to the shaft and forming a skeletal frame; and
a fabric cover wrapped around and being detachably coupled to and resiliently carried by the skeletal frame;
said fabric cover including a base component which has opposite ends which are joined together when wrapped around the skeletal frame, and a shingle component which includes a plurality of diametrically opposed shingles which extend radially outwardly by centrifugal force when the rotatable shaft is rotated, said shingle component being made of a deep pile, fur-like material which is a tufted monofilament fibrous material comprised of about 85% polyester and about 15% acrylic and which extends outwardly from at least one surface of a fabric layer.

25. A cover for a rotatable drum of a vehicle washing apparatus comprising:
a base component comprised of a deep pile, fur-like material and formed as an endless belt; and
a shingle component which includes a plurality of shingle segments connected to the base component, each shingle segment having a plurality of shingles which extend radially outwardly under centrifugal force.

26. A cover according to claim 25, wherein the deep pile fur-like material is a tufted monofilament fibrous material which extends outwardly from a fabric layer.

27. A cover according to claim 26, wherein the material is made of about 85% polyester and about 15% acrylic.

28. A cover according to claim 26, wherein the fabric layer is elastic.

29. A cover according to claim 28 further comprising a relatively non-elastic backing connected to a smooth surface of the fabric layer.

30. A cover according to claim 26, wherein the fabric layer is made of polyester.

31. A cover for a rotatable drum of a vehicle washing apparatus comprising:
a base component formed as an endless belt; and
a shingle component which includes a plurality of shingle segments connected to the base component, each shingle segment having a plurality of shingles which extend radially outwardly under centrifugal force;
said shingle component being made of a deep pile, fur-like material which is a tufted monofilament fibrous material comprised of about 85% polyester and 15% acrylic and which extends outwardly from a fabric layer.

32. A cover for a rotatable drum of a vehicle washing apparatus comprising:
a base component formed as an endless belt; and
a shingle component which includes a plurality of shingle segments connected to the base component, each shingle segment having a plurality of shingles which extend radially outwardly under centrifugal force;
said shingle component being made of a deep pile, fur-like material which is a tufted monofilament fibrous material which extends outwardly from an elastic fabric layer.

33. A cover according to claim 32, wherein the fabric layer is made of polyester.

34. A cover according to claim 33, further comprising a relatively non-elastic backing connected to a smooth surface of the fabric layer.

35. A vehicle washing apparatus comprising:
a rotatable support having a distal end portion;
resilient means comprising a core member made of resilient foam material coupled to the rotatable support; and
a fabric cover wrapped around and being detachably coupled to and resiliently carried by the resilient means, said fabric cover including a base component of deep pile, fur-like material having opposite ends which are joined together when wrapped around the core member.

36. A vehicle washing apparatus according to claim 35, wherein the deep pile fur-like material is a tufted monofilament fibrous material.

37. A vehicle washing apparatus according to claim 36, wherein the material is about 85% polyester and about 15% acrylic.

38. A vehicle washing apparatus according to claim 35, wherein the fabric cover includes a shingle component which includes a plurality of diametrically opposed shingles which extend radially outwardly by centrifugal force when the rotatable support is rotated.

39. A vehicle washing apparatus according to claim 38, wherein the shingle component is made of the same material as the base component.

40. A vehicle washing apparatus according to claim 36, wherein the fabric layer is elastic.

41. A vehicle washing apparatus according to claim 40, wherein the fabric layer is made of polyester.

42. A vehicle washing apparatus according to claim 40, further comprising a relatively non-elastic backing connected to a smooth surface of the fabric layer.

43. A mechanized vehicle washing apparatus comprising:
   at least one movable support;
   a cleaning element carried by the at least one movable support, the cleaning element being made of a deep pile, fur-like material comprising a tufted monofilament fibrous material which extends outwardly from an elastic fabric layer; and
   a relatively non-elastic backing connected to a smooth surface of the fabric layer.

* * * * *